United States Patent [19]

Fukui et al.

[11] Patent Number: 5,474,745
[45] Date of Patent: Dec. 12, 1995

[54] CATALYTIC CONVERTER FOR PURIFYING EXHAUST GAS

[75] Inventors: Masayuki Fukui, Toyoake; Koji Yokota, Nagoya; Yutaka Yokoi, Seto; Yujiro Oshima, Nagoya, all of Japan

[73] Assignee: Kabushiki Kaisha Toyota Chuo Kenkyusho, Aichi, Japan

[21] Appl. No.: 304,228

[22] Filed: Sep. 12, 1994

[30] Foreign Application Priority Data

Sep. 16, 1993 [JP] Japan .................................. 5-254688
Dec. 28, 1993 [JP] Japan .................................. 5-350257

[51] Int. Cl.⁶ .............................. F01N 3/00; B01J 35/04; B01D 53/92
[52] U.S. Cl. ........................ 422/171; 422/173; 422/191; 422/193; 60/274
[58] Field of Search ............................ 422/169, 171, 422/172, 173, 180, 190, 191, 192, 193, 198; 60/274, 273; 423/213.2

[56] References Cited

U.S. PATENT DOCUMENTS

| | | | |
|---|---|---|---|
| 2,547,916 | 4/1951 | Wenner . | |
| 4,175,107 | 11/1979 | Iwaoka et al. | 422/114 |
| 4,843,056 | 6/1989 | Matsumoto et al. | 502/302 |
| 4,900,517 | 2/1990 | Fukui et al. | 422/171 |
| 4,945,721 | 8/1990 | Cornwell et al. | 60/274 |
| 4,948,774 | 8/1990 | Usui et al. | 502/439 |
| 4,988,483 | 1/1991 | Usui et al. | 422/180 |
| 5,041,270 | 8/1991 | Fujitani et al. | 423/213.2 |
| 5,108,716 | 4/1992 | Nishizawa | 422/171 |
| 5,113,653 | 5/1992 | Usui et al. | 60/299 |
| 5,270,024 | 12/1993 | Kasahara et al. | 423/213.2 |
| 5,272,871 | 12/1993 | Oshima et al. . | |
| 5,302,355 | 4/1994 | Fujikura et al. | 422/180 |
| 5,308,501 | 5/1994 | Whittenberger | 422/174 |
| 5,346,675 | 12/1994 | Usui et al. | 422/180 |

*Primary Examiner*—Robert J. Warden
*Assistant Examiner*—N. Bhat
*Attorney, Agent, or Firm*—Oblon, Spivak, McClelland, Maier, & Neustadt

[57] ABSTRACT

An apparatus for efficiently purifying NOx in the exhaust gas or soluble organic substance in the exhaust gas from a diesel engine. A plurality of purification units are arranged in a housing, each of which is composed of a catalytic layer for reducing NOx and a cooling core for cooling the exhaust gas admitted through the catalytic layer. The multi-staged purification units are so constructed to admit the exhaust gas to flow therethrough. The catalytic layer in the form of a porous carrier such as a honeycomb structure carries catalytic components. Upon purifying soluble organic substance in the exhaust gas from a diesel engine, the catalytic components carried on the catalytic layer serve to efficiently purify such substance, as well as inhibiting the reaction to form sulfate.

22 Claims, 13 Drawing Sheets

(A) ····· platinum/silica
(B) ── palladium/mordenite

<(A)platinum/silica>

<(B)palladium/mordenite>

CATALYTIC CONVERTER FOR PURIFYING EXHAUST GAS

BACKGROUND OF THE INVENTION

1. Field of the Invention

The present invention relates to the de-NOx purification process where NOx in the exhaust gas is reduced in the presence of stoichiometrically excess amount of oxygen, the exhaust gas purification process where soluble organic substance in the exhaust gas from a diesel engine is purified, and catalytic converters used in the above processes.

2. Description of Related Arts

Catalytic converters have been typical measures for purifying the exhaust gas emitted from a vehicle engine. As FIG. 17 shows, the conventional catalytic converter comprises a housing 95 and a catalytic layer 91 disposed in the housing 95. The catalytic layer 91 is a ceramics or metal carrier (monolith) of honeycomb type loading catalytic component such as platinum, palladium, and the like. The length of the carrier available for the vehicle is typically in the range from several 10s to 300 mm.

In the case of "oxidation catalyst" for purifying HC, CO and the like in the exhaust gas, and "three way catalyst" for oxidizing HC and CO concurrently with reducing NOx in the exhaust gas in theoretical mixture combustion, the higher initial temperature of the gas admitted into the catalytic layer will accelerate the reaction and improve the conversion efficiency.

In the above both cases, the upper limit of the initial gas temperature is determined based on the heat-resistance property of materials used as the carrier and catalyst constituting the catalytic layer, rather than reactions.

In the case of "de-NOx catalyst" for reducing NOx in the exhaust gas containing stoichiometrically excess amount of oxygen, the initial gas temperature is so kept to bring the conversion efficiency to a peak value. If the temperature is further increased, the conversion efficiency will decline because the NOx purification ability reduces. The gas temperature for the peak conversion efficiency varies depending upon what type of reductants and catalyst are used. For example, when using $H_2$ as the reductant, the temperature will be in the range from 90° to 130° C. When using the material selected from HC group such as propylene as the reduction agent, it will be in the range from 250° to 350° C. Further increase in the temperature will deteriorate the purification ability.

However, unless the high temperature destroys the carrier-forming material, the purification ability can be restored when the initial gas temperature lowers again. With the three way catalyst, the NOx conversion efficiency reaches approximately 80% or more. In contrast, with the de-NOx purification in the presence of stoichiometrically excess amount of $O_2$, the ratio is as low as 30 to 50% or less.

Followings are considered to be relevant factors to achieve the peak conversion efficiency at a specific temperature in the de-NOx purification process.

(a) Catalytic component such as platinum is effective for both reactions of reduction (between reductant and NOx) and oxidation (between reductant and $O_2$).

(b) Both reactions occur almost simultaneously. The temperature will affect as to which reaction is predominant.

(c) The exhaust gas in the presence of stoichiometrically excess amount of $O_2$ tends to have substantially higher $O_2$ concentration (2–3% or more) than NOx concentration (2,000–3,000 PPM or less). Increasing the amount of the reductant for higher conversion efficiency will facilitate the oxidation between $O_2$ and reductant. Then exothermic heat of the oxidation will lead to increasing the catalytic temperature, resulting in undesirable cycle for further facilitating oxidation.

After conducting various examinations with respect to the peak conversion efficiency, the following findings were obtained through the de-NOx purification process using $H_2$ as the reductant.

(d) Removing $O_2$ from the exhaust gas (keeping the concentration of other components such as NOx intact) increased NOx conversion efficiency to a considerably high value, which is equivalent to or more than that of the three way catalyst.

(e) Increasing the catalytic volume by lengthening the catalytic layer (carrier) along the exhaust gas flow does not increase the conversion efficiency, unlike the three way catalyst.

(f) In the case of the exhaust gas containing NOx and $O_2$, the catalytic temperature increased sharply at the point going down by several millimeters from the inlet to the catalytic layer.

(g) On the contrary to (d), removing NOx exhibited the same tendency as in (f), sharp increase in the temperature at the same point.

(h) The reaction between NOx and $H_2$ occurred very quickly at the point going down by several millimeters from the inlet to the catalytic layer. After passing such point, the reaction between $O_2$ and $H_2$ occurred predominantly to inhibit reduction between NOx and $H_2$.

The structure of catalytic converter used for the de-NOx catalyst is basically the same as those used for "catalytic oxidation" and "three way catalyst" except that the noble metal to be carried is variable depending on the usage. However, the respective reactions at the catalyst are greatly different from each other. Especially the NOx catalyst fails to attain sufficient conversion efficiency, without effective process for the de-NOx purification.

The exhaust gas emitted from the diesel engine contains sulfur compound such as $SO_2$ as well as soluble organic substance such as hydrocarbons. When removing the soluble organic substance through oxidation, the exothermic heat of the oxidation will increase the exhaust gas temperature. Excessive increase in the temperature may oxidize the sulfur compound to form sulfate such as $SO_3$, $H_2SO_4$ and the like, which are air pollutants. (see Embodiment 7)

It is necessary to provide the effective process for purifying the soluble organic substance without forming the sulfate. The soluble organic substance is likely to be produced especially when operating the diesel engine at low speeds and low loads.

SUMMARY OF THE INVENTION

It is an object of the present invention to provide the process for efficiently purifying the exhaust gas emitted from an engine, and the catalytic converter used in the process.

The present invention provides the process for purifying NOx in exhaust gas containing stoichiometrically excess amount of oxygen through arranging a plurality of purification units serially, each of which is composed of a catalytic layer for reducing NOx and a cooling core for cooling the exhaust gas admitted through the catalytic layer; and admitting the exhaust gas sequentially through the purification units.

DETAILED DESCRIPTION OF THE INVENTION

Figure 1:
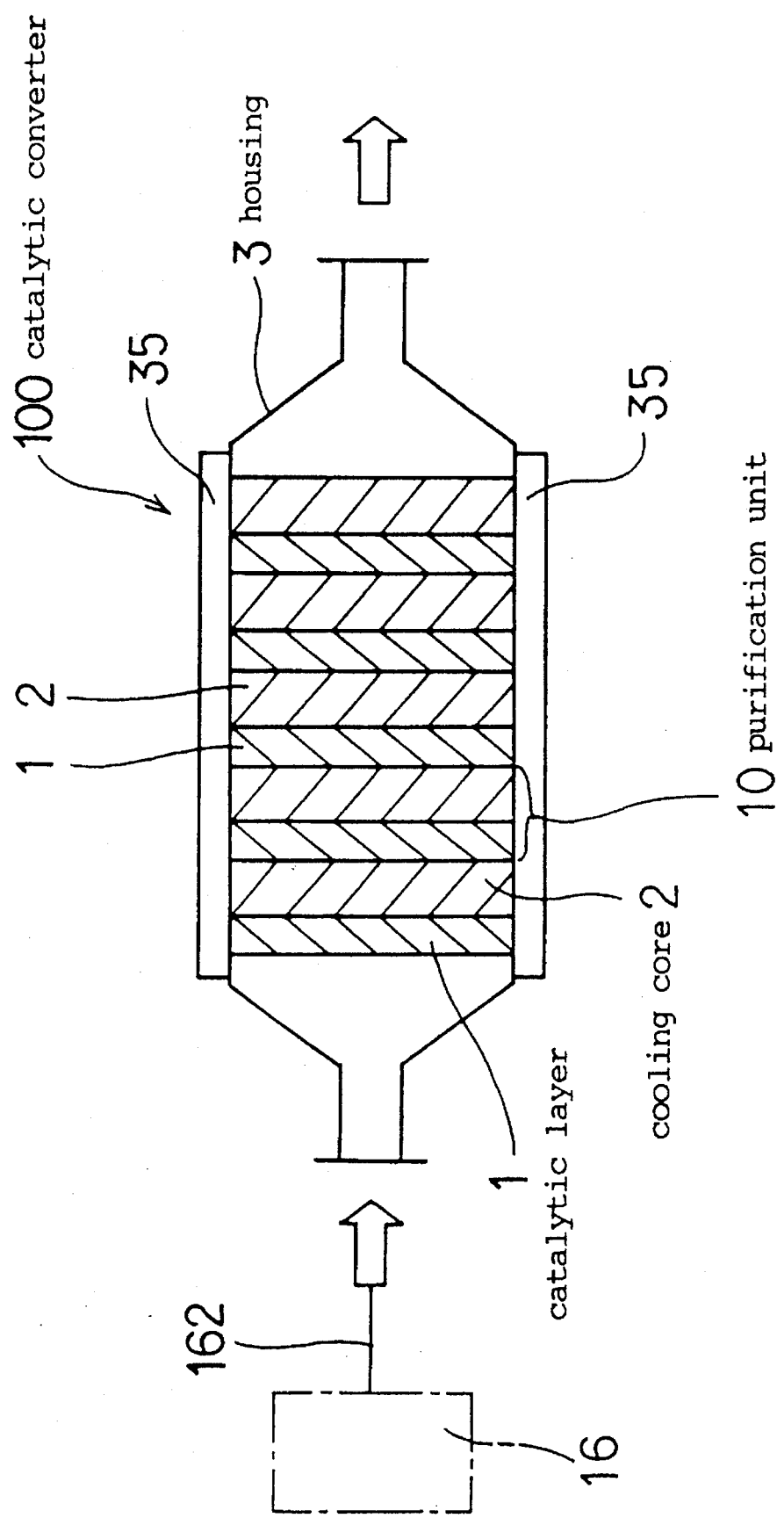
FIG. 1 is an explanatory view of the catalytic converter of Embodiment 1.

The most important feature of the present invention is to serially arrange a plurality of purification units, each of which is composed of a catalytic layer and a cooling core, through which the exhaust gas flows sequentially.

In order to increase the conversion efficiency for reducing NOx in the exhaust gas, it is necessary to inhibit oxidation between the reductant and $O_2$ occurring concurrently with or slightly behind the reduction.

Since no catalyst is available for inhibiting oxidation, it is important to keep temperatures of the gas and catalyst from increasing by releasing the exothermic heat to outside immediately. The catalytic component such as platinum is effective for both reduction and oxidation.

It is, thus, obvious that the use of unitary monolith converter based on the conventional process hardly improves NOx conversion efficiency.

The oxidation may be inhibited by releasing its exothermic heat, taking advantage of the difference of occurrence or proceeding timing between oxidation and reduction (oxidation occurs slightly behind the reduction).

In the catalytic converter of the present invention, each purification unit is designed to achieve the specific NOx conversion efficiency at which the exothermic heat of oxidation concurrently with reduction can be sufficiently released by using cooling core. Stacking the above multiple units will achieve higher conversion efficiency in total as well as inhibiting oxidation.

The exhaust gas containing $O_2$ refers to the gas emitted from the vehicle engine. In the de-NOx purification process of the present invention, reductant such as $H_2$ and propylene is reacted with NOx to be purified into $N_2$ and $H_2O$. The above reductants may be contained in or added to the exhaust gas.

The catalytic converter used for the NOx purification process contains a plurality of purification units serially arranged in a housing, each of which is composed of the catalytic layers for reducing NOx and cooling cores for cooling the exhaust gas flowing through the catalytic layers, through which the exhaust gas flows sequentially.

The catalytic layer is composed of catalytic component such as platinum, palladium, rhodium, copper and nickel and a porous carrier which carries the catalytic component. The porous carrier is preferably formed into honeycomb structure for carrying the catalytic component as much as possible. The honeycomb structure may be formed of ceramics or metal.

The catalytic carrier may preferably be formed by coating ceramics on the wire netting for reducing its length, or perforated metal provided with slits for ventilation. With the above structures, heat release from the porous carrier can be effectively enhanced. The catalytic layer preferably has its thickness ranging from 1 to 20 mm. If it is less than 1 mm, sufficient amount of the catalytic component cannot be carried. If it exceeds 20 mm, heat accompanied by oxidation concurrently with NOx reduction will be accumulated in the catalytic layer to decrease the NOx conversion efficiency.

The cooling core may be preferably formed into the metal honeycomb structure, which allows exothermic heat in the catalytic layer to be effectively transferred to the housing for releasing. The cooling core may be formed into the wire netting or perforated metal for reducing its weight.

The cooling core may be formed of the metal selected from the group of stainless steel, heat-resistance steel, copper, and aluminum.

The housing preferably has fins for heat release on its outer periphery, which allows heat in the catalytic converter to be efficiently released to the outside. The housing may be preferably formed of metal for effective heat release.

A plurality of purification units may be so arranged that the carried amount of catalytic component in each catalytic layer is incremented sequentially, or the substance carried in each catalytic layer is varied from upstream to downstream along the length of the catalytic converter.

As the exhaust gas passes through the catalytic converter from unit to unit, concentration of the unpurified NOx will be decreased. Accordingly if the carried amount of the catalytic component is increased, or carried substance is varied along the gas flow to downstream, the conversion efficiency will be increased. The catalytic layer of the unit placed in the downstream may be provided with substance having NOx adsorption and occlusion abilities, such as barium, to further increase the conversion efficiency.

As the reductant in the exhaust gas is used for NOx purification, its amount will decrease at the gas flows to downstream through the converter. It is, thus, preferable to supply a small amount of reductant, such as gasoline vapor, between the units in downstream. Such provision also improves efficiency of NOx purification.

The space may be preferably provided between the respective catalytic layers and cooling cores so that the heated exhaust gas flowing from the catalytic layer will be mixed to have averaged temperature in the space before flowing into the succeeding cooling core. Such mixing will permit the cooling core to cool the gas efficiently, resulting in improved conversion efficiency.

The space is preferably in the range from 4 to 20 mm. If it is less than 4 mm, the effect can be hardly obtained. If it exceeds 20 mm, the catalytic layer will be longer and further effect cannot be expected.

In order to obtain the same effects provided by the present invention, 3–15 stages of purification units are required.

It may be preferable to provide an oxidation catalytic layer in downstream of a pluraly of purification units for oxidizing hydrocarbons contained in the exhaust gas.

This layer serves to remove hydrocarbons as unpurified through multi-staged purification units. The catalytic component of the oxidation catalytic layer may be platinum, palladium, rhodium, and the like.

The present invention provides a process for purifying soluble organic substance including hydrocarbons in the exhaust gas from a diesel engine through arranging a plurality of purification units serially, each of which is composed of an exhaust oxidation catalytic layer for oxidizing the soluble organic substance and a cooling core for cooling the exhaust gas admitted through the exhaust oxidation catalytic layer, and admitting the exhaust gas through the purification units sequentially.

The present invention also provides a catalytic converter for purifying the exhaust gas including a plurality of purification units serially arranged in a housing, each of which is composed of an exhaust oxidation catalytic layer for oxidizing a soluble organic substance such as hydrocarbons in the exhaust gas from the diesel engine, and a cooling core for cooling the exhaust gas admitted through the exhaust oxidation catalytic layer, through which the exhaust gas flows sequentially.

The soluble organic substance refers to hydrocarbons as a component of the fuel with a high boiling point, or lubricating oil mixed in the cylinder. The exhaust gas emitted from the diesel engine contains sulfur compound as well as hydrocarbons.

The catalytic component of the exhaust oxidation catalytic layer for oxidizing the soluble organic substance may be platinum, palladium, rhodium and transition metal such as vanadium, chromium, nickel, cobalt, iron and manganese to be combined therewith.

The exhaust oxidation catalytic layer preferably uses honeycomb structure as the porous carrier.

In order to reduce the length of the porous carrier, the catalytic carrier may be formed by coating ceramics on the wire netting or the punching metal. The thickness of the catalytic layer may be ranged from 1 to 20 mm as described above. The exhaust gas oxidation catalytic layer is the same as that used for the aforementioned NOx purification.

The cooling core is also the same as that used for the NOx purification. Preferably the purification units are so arranged that the carried amount of the catalytic component in each exhaust oxidation catalytic layer increases gradually from upstream to downstream along the length of the catalytic converter.

The space may be preferably provided between the respective exhaust gas oxidation catalytic layers and the cooling cores. The applicable space size and the number of the purification units are preferably the same as described above.

In the NOx purification process according to the present invention, the exhaust gas emitted from the engine is admitted into the catalytic layer of the first purification unit. Here NOx is reduced into $N_2$ and $H_2O$. Concurrently the reduction substance and $O_2$ are subjected to oxidation to produce exothermic heat to increase the temperature of the gas. The amount of the exothermic heat of reduction is negligible compared with that produced through the oxidation. The heated exhaust gas flows into the succeeding cooling core to be cooled through heat transfer to the outside.

The cooled exhaust gas flows into the catalytic layer of the second purification unit where reduction occurs. It flows into the cooling core of the purification unit to be cooled in the same manner as in the first unit. As the exhaust gas flows through catalytic layers and cooling cores of multi-staged units, NOx contained in the gas will be purified through a series of reduction. The exhaust gas is kept at the specified temperature for optimum purification by cooling exothermic heat of oxidation in the cooling core.

The above-described system allows NOx in the exhaust gas to be efficiently purified. Using the catalytic converter will achieve excellent NOx conversion efficiency. The present invention, thus, provides excellent process for purifying NOx and catalytic converter used in the process.

In the process for purifying the exhaust gas emitted from the diesel engine, the exhaust gas flows into the exhaust oxidation catalytic layer of the first purification unit. The soluble organic substance in the exhaust gas is oxidized to produce exothermic heat of reaction. The heated exhaust gas flows into the cooling core where heat is transferred to the cooling core to be released to the outside.

The temperature of the gas passed through the cooling core becomes almost the same as the initial gas temperature before the gas flows into the second purification unit. In the unit onward, the same cycle as in the first unit, i.e., oxidation (purification), heat production, and heat release, will repeatedly occur. The exhaust gas is maintained at the same initial gas temperature. Such temperature of the exhaust gas is not increased to become extreme by high enough to oxidize the sulfur compound to form sulfate.

Unlike the conventional monolith catalytic converter of long, unitary type, the converter of the present invention prevents the exhaust gas temperature from increasing to form sulfate. As described above, the present invention provides the process for purifying exhaust gas and catalytic converter used for the process, which allows to efficiently purify the soluble organic substance without forming sulfate.

EMBODIMENTS

Embodiment 1

FIGS. 1 through 4 show the process for purifying NOx and catalytic converter used in the process of Embodiment 1 according to the present invention.

A catalytic converter 100 has a plurality of purification units 10 arranged within a housing 3, each of which is composed of a catalytic layer 1 for reducing NOx and a cooling core 2 for cooling the exhaust gas flowing through the catalytic layer 1 as shown in FIG. 1. The exhaust gas is designed to flow through those units 10 sequentially.

Figure 4:
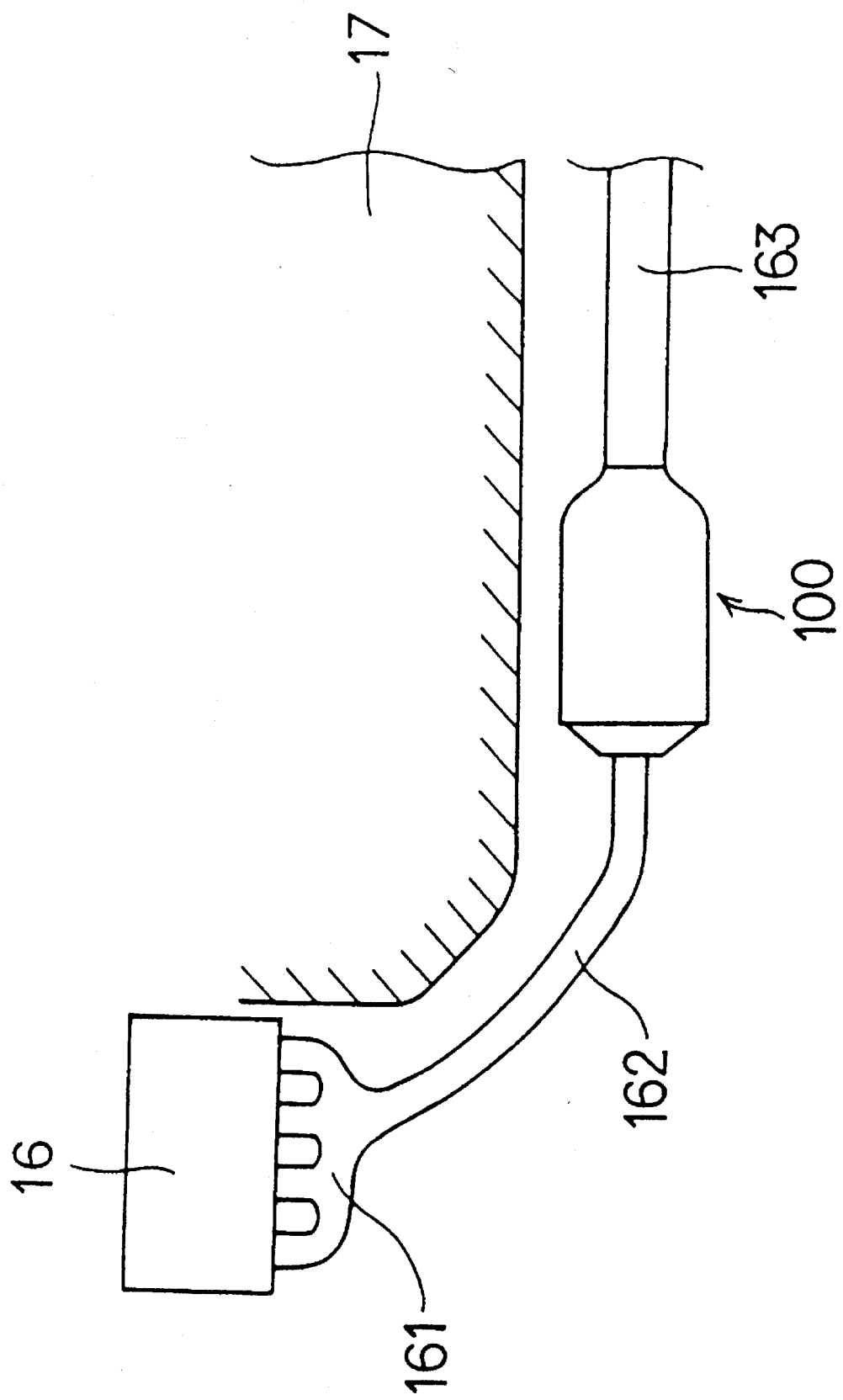
FIG. 4 is a lay-out of the catalytic converter of Embodiment 1.

As FIGS. 1 and 4 show, the catalytic converter 100 is connected to an exhaust manifold 161 of an engine 16 through an exhaust gas pipe 162. The downstream side of the catalytic converter 100 is connected to a muffler (not shown) through an exhaust gas pipe 163. The reference numeral 17 in FIG. 4 refers to the floor of the automobile.

Figure 2A:
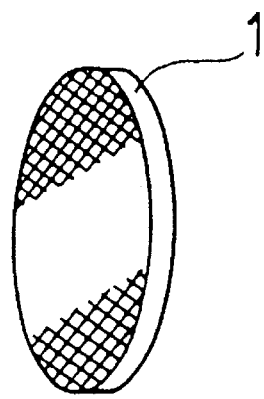
FIGS. 2A and 2B are perspective views representing the catalytic layer (A) and the cooling core (B) of Embodiment 1, respectively.

The catalytic layer 1 is formed into the honeycomb structure with small thickness (0.5–1.0 mm) as FIG. 2A shows. The honeycomb structure carries the catalytic component capable of purifying NOx in the exhaust gas containing stoichiometrically excess amount of $O_2$. The honeycomb structure may be formed of cordierite ceramics to carry platinum as the catalytic component.

Figure 2B:
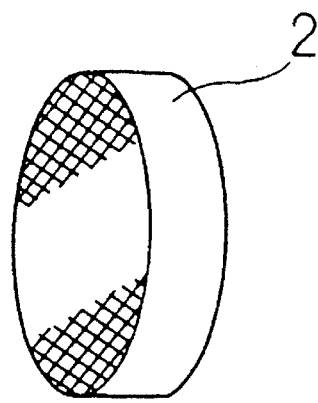

The cooling core is formed into a stainless steel honeycomb structure having the thickness larger than that of the catalytic layer as FIG. 2B shows. The thickness may be 1 mm–2 mm. The housing 3 is also formed of stainless steel.

Figure 3:
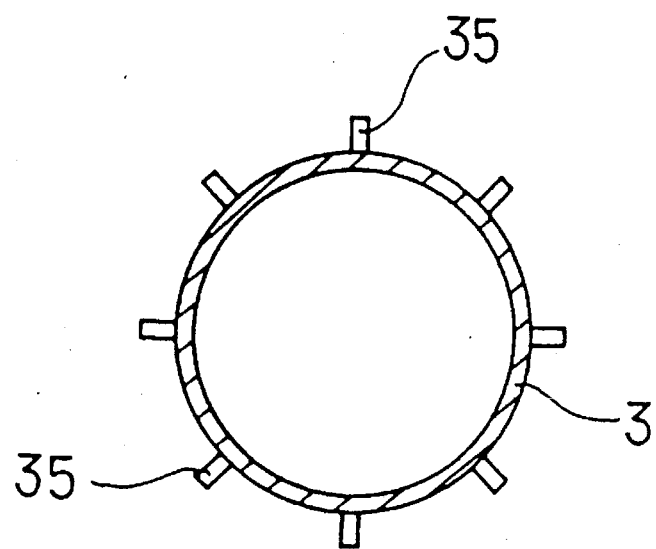
FIG. 3 is a sectional view of a housing of Embodiment 1.

In this embodiment, 5 stages of the purification units 10 respectively composed of the catalytic layers 1 and the cooling cores 2 are serially arranged in the housing 3. As FIGS. 1 and 3 show, fins 35 are provided with outer periphery of the housing 3 along with the length thereof.

As FIG. 1 shows, in the process for purifying NOx by means of the catalytic converter 100, the exhaust gas emitted from the engine 16 is admitted into the catalytic converter 100. The gas flows into the catalytic layer 1 of the first purification unit, where NOx is reduced into $N_2$ and $H_2O$. The reaction between reductant and $O_2$ which occurs slightly behind the reduction will produce heat to increase the exhaust gas temperature.

The heated gas flows into the cooling core 2 where the gas is deprived of its heat to be released to the housing 3. The fins 35 provided with the housing 3 allow the exothermic heat to be efficiently released outside the catalytic converter 100, thus cooling the gas from the first purification unit 10.

The cooled gas from the first purification unit 10 flows into the catalytic layer 1 of the second purification unit 10 for reduction. The exothermic heat of the reaction will be removed in the cooling core 2 in the same manner as in the first unit.

The exhaust gas is designed to pass through serially arranged 5 purification units with its temperature kept at specified value for obtaining peak conversion efficiency, as well as inhibiting oxidation. Embodiment 1, thus, provides efficient process for purifying NOx in the exhaust gas.

Embodiment 2

Figure 5A:
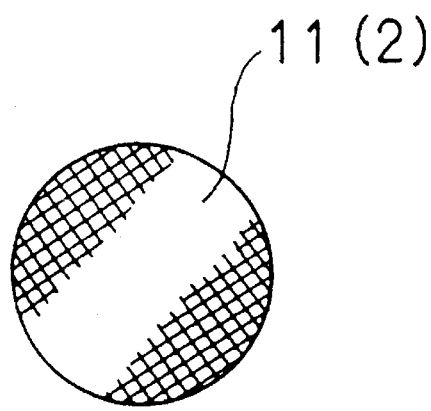
FIGS. 5A and 5B are front and sectional views of the catalytic layer in Embodiment 2, respectively.
Figure 5B:
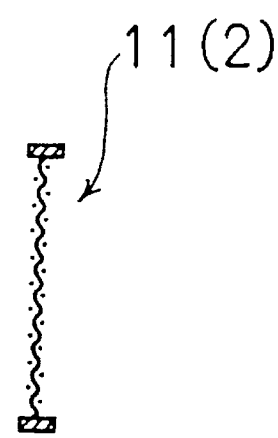

This embodiment uses a wire netting as a catalytic layer 11 as FIGS. 5A and 5B show. The netting catalytic layer 11 is constructed by coating carrier-forming ceramics particle to the surface of the netting to have catalytic component carried thereon. The wire netting has its wire diameter ranging from 0.6 to 1.0 mm and mesh size of 1 $mm^2$.

The netting provided with no catalytic component nor ceramics particles may be used as the cooling core 2. A plurality of wire nettings may be stacked for adding to thickness to be used either as the catalytic layer or the cooling core. Other features are the same as those in Embodiment 1. The same effects as those in Embodiment 1 can be obtained.

Embodiment 3

Figure 6A:
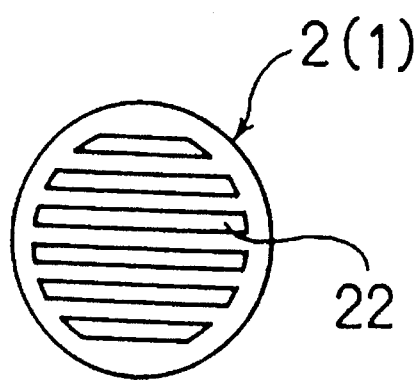
FIGS. 6A and 6B are front and sectional views of the cooling core of Embodiment 3, respectively.
Figure 6B:
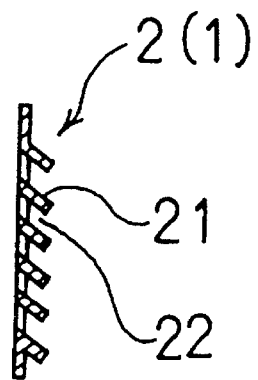
Figure 7:
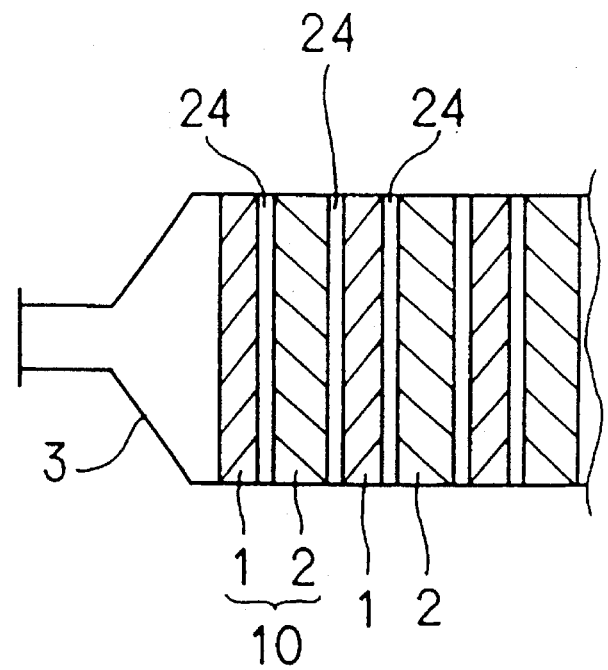
FIG. 7 is an explanatory view of the catalytic converter of Embodiment 4.

This embodiment uses the perforated metal as the cooling core 2 for the catalytic converter as FIGS. 6A and 6B show. It is formed of a metal plate about 0.5 mm thick which is provided with slits 22 for ventilation. Bit pieces 21 formed through making the slits 22 have their one edges fixed thereto.

It may be used as the catalytic layer 1 by providing ceramics particles and catalytic component therewith as described in Embodiment 2. A plurality of perforated metal plates may be stacked for adding to the thickness of the cooling core 2 and the catalytic layer 1. Other features are the same as those in Embodiment 2. The same effects as those in Embodiment 1 can be obtained.

Embodiment 4

In Embodiment 4, the catalytic layers 1 and the cooling cores 2 are placed in parallel, and spaces 24 are interposed among them. Other features are the same as Embodiment 1.

Since the spaces 24 are provided between the respective catalytic layers 1 and the cooling cores 2, and among the respective purification units 10, the exhaust gas passing through the first catalytic layer causes turbulence in the succeeding space 24 for mixing. Then the gas flows into the cooling core 2 to be cooled.

After passing through the first cooling core, the gas is mixed in the space 24 before flowing into the next catalytic layer 1. The exhaust gas heated in the catalytic layer 1 can be efficiently cooled. This embodiment, thus, provides the same effects as those obtained in Embodiment 1.

Embodiment 5

In this embodiment, the initial temperature of the exhaust gas before entering into the catalytic converter (the same type as used in Embodiment 1) is varied to measure the respective conversion efficiencies of NOx.

Figure 8:
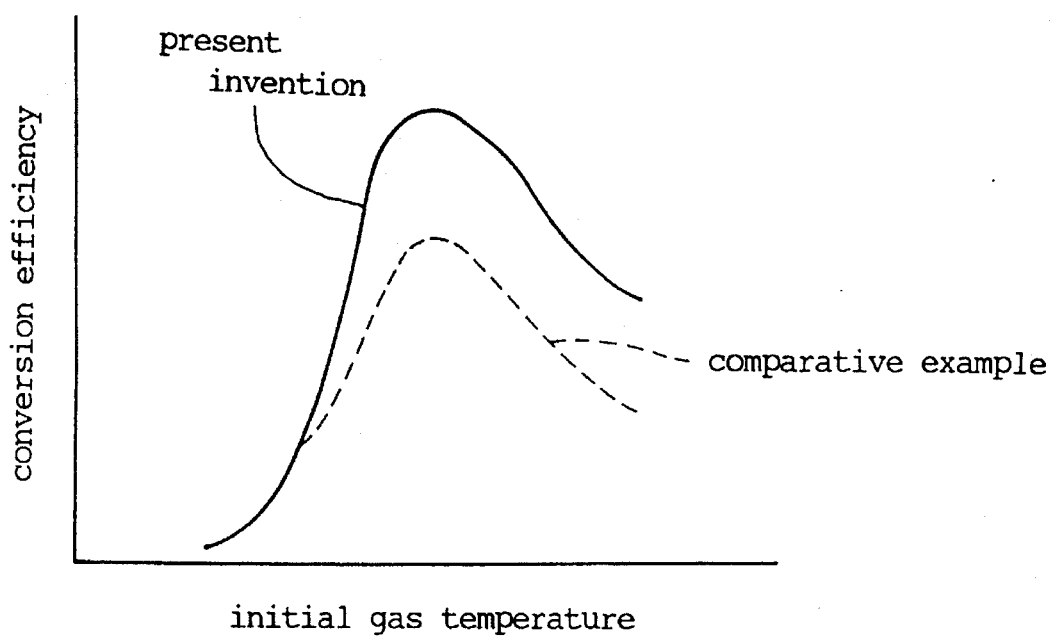
FIG. 8 is a graph showing the relationship between initial gas temperature and NOx conversion efficiency in Embodiment 5.

The measurement used the de-NOx purification process for purifying NOx in the exhaust gas containing oxygen emitted form the vehicle engine. For comparative purposes, the same measurement was carried out by means of the conventional catalytic converter. FIG. 8 shows the measurement results.

The catalytic converter of the present invention was formed into ceramics honeycomb structure having the thickness of 5 mm in axial direction. The cooling core was formed into metal honeycomb structure having thickness of 10 mm. The purification unit as a pair of the catalytic layer 1 and the cooling core 2 was 15 mm long. This embodiment used 10 stages of units (total length: 200 mm), and platinum-rhodium as the catalytic component to be carried on the catalytic layer 1.

The catalytic layer 1 of the comparative example had the length equivalent to the total length of all the purification units. Other features were the same as above-described. The comparative example used no cooling cores.

As FIG. 8 shows, the catalytic converter of the present invention and the conventional converter measured high conversion efficiencys when the initial temperatures of the gas are in the same range. Since the converter of the present invention uses the purification unit composed of the catalytic layer and the cooling core, it measured higher conversion efficiency than that of the conventional one in the comparative example.

Embodiment 6

Figure 9:
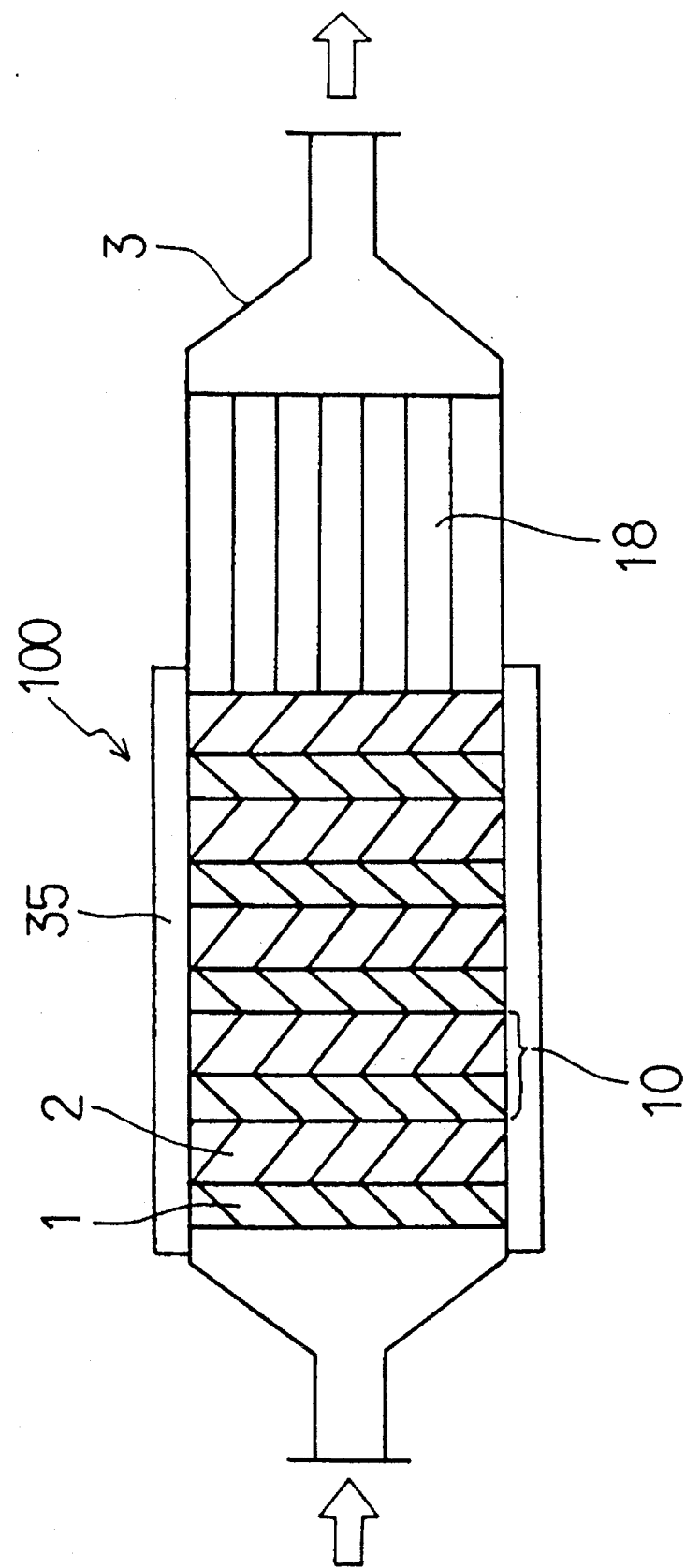
FIG. 9 is an explanatory view of the catalytic converter of Embodiment 6.

In this embodiment, an oxidation catalytic layer 18 is added to downstream side of the purification units 10 of the catalytic converter as FIG. 9 shows. The oxidation catalytic layer 18 is placed to succeed the last purification unit in the housing 3. Other features are the same as those in Embodiment 1.

The oxidation catalytic layer 18 may be 80 mm long, using palladium or platinum as oxidation catalytic component. The oxidation catalytic layer 18 is not influenced by the increase in temperature, eliminating the need for heat releasing. The housing over the oxidation catalytic layer 18 is not provided with fins on its outer periphery.

In this embodiment, the oxidation catalytic layer 18 helps to efficiently purify hydrocarbons in the exhaust gas as unpurified through multi-staged purification units. When applying 3-way catalyst, lean burn NOx catalyst, and diesel engine exhaust gas NOx catalyst to the catalytic layer 1 of the unit 10 for purifying NOx by means of hydrocarbons as reductant, the residual hydrocarbons used for NOx purification should be purified. The process of this embodiment allows such residual hydrocarbons to be efficiently purified. Other effects can be obtained in the same manner as in Embodiment 1.

Embodiment 7

Figure 10:
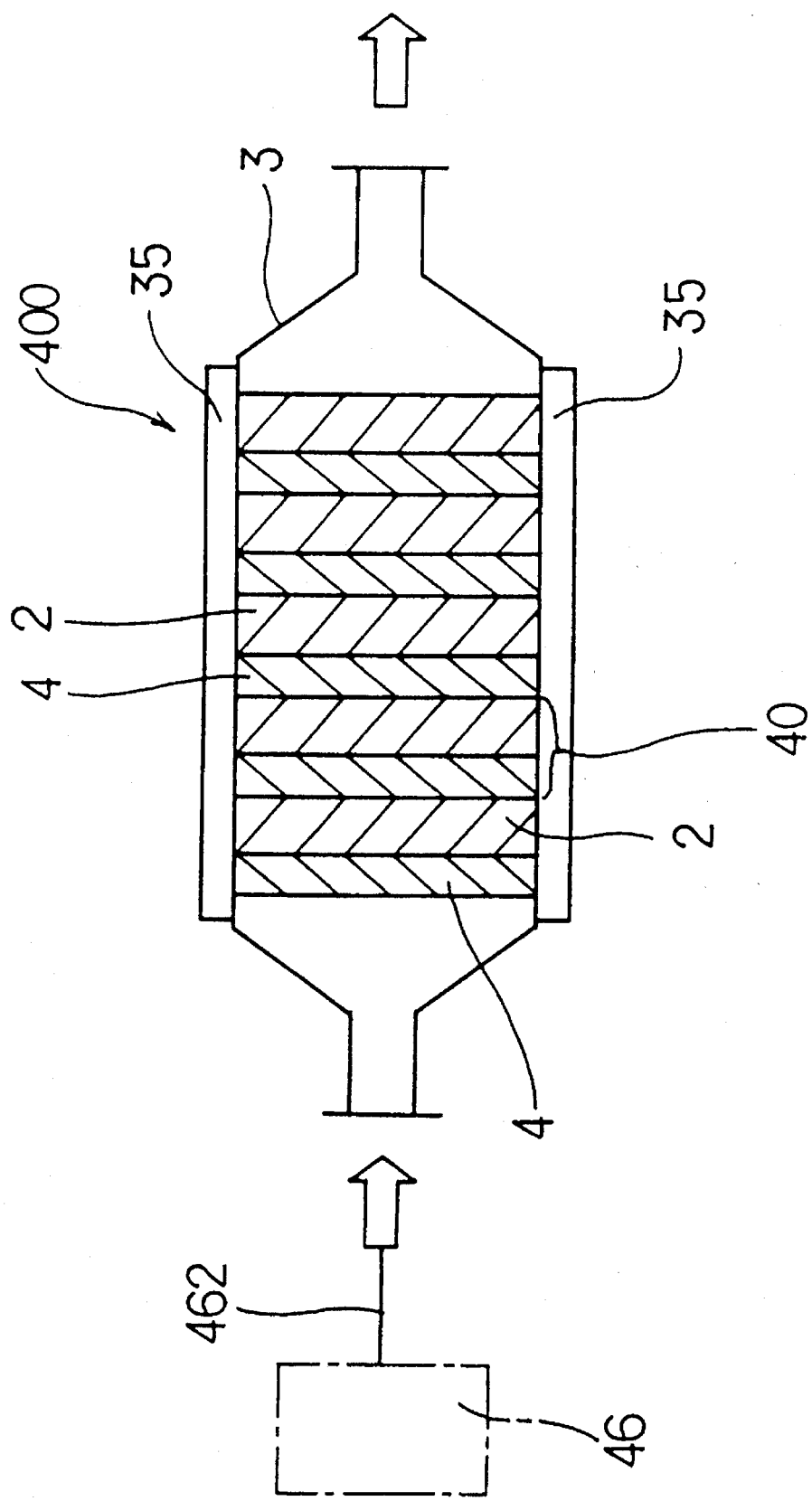
FIG. 10 is an explanatory view of the catalytic converter of Embodiment 7.
Figure 11:
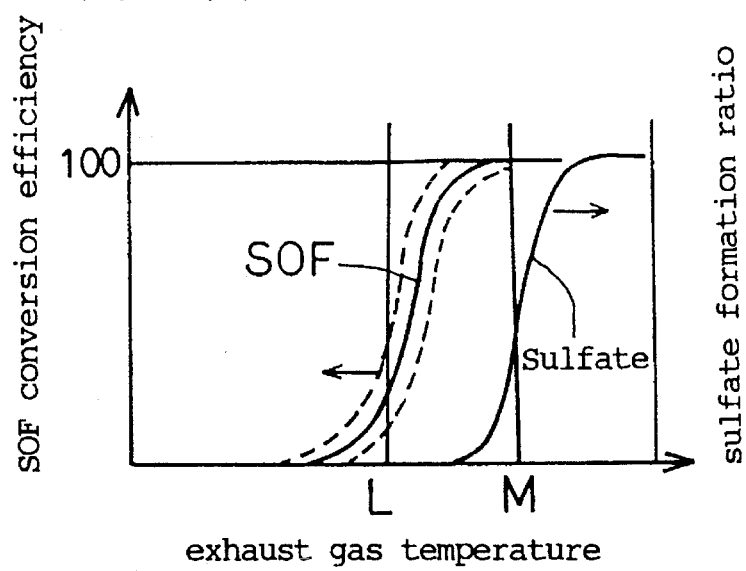
FIG. 11 is a graph showing the relationships between exhaust gas temperature, and the conversion efficiency of soluble organic substance or the sulfate formation ratio in Embodiment 7.
Figure 12:
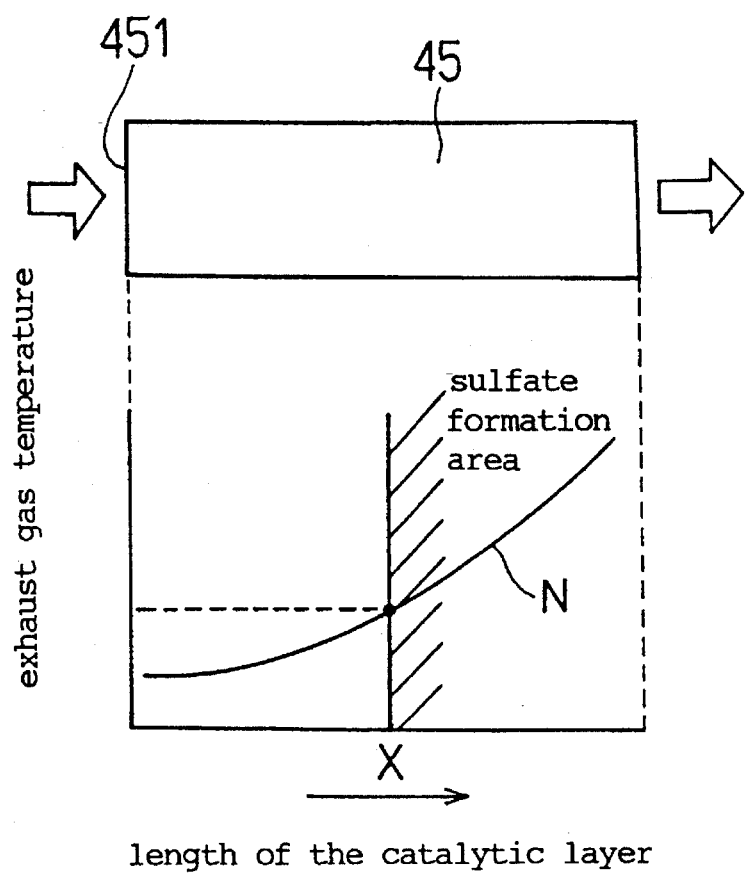
FIG. 12 is a graph showing relationship between the length of the catalytic converter and the increase of the exhaust gas temperature in Embodiment 7.

FIGS. 10 thru 12 show the process for purifying the exhaust gas from the diesel engine and the catalytic converter used for the process. The catalytic converter 400 has a plurality of the purification units, each of which is composed of an exhaust oxidation catalytic layer 4 for oxidizing the soluble organic substance in the exhaust gas from diesel engine 46, such as hydrocarbons, and a cooling core 2 for cooling the exhaust gas passing through the oxidation layer 4. Those purification units 40 are serially arranged in the housing 3, through which the exhaust gas flows sequentially.

As FIG. 10 shows, the catalytic converter 400 is connected to a diesel engine 46 through the exhaust pipe 462. The housing 3 has fins 35 for releasing heat on its outer periphery in the same manner as in Embodiment 1. The exhaust oxidation catalytic layer 4 uses catalytic component selected from platinum group. The carrier bearing the catalytic component is formed into alumina group honeycomb structure which is 30 mm long. Other features are the same as those in Embodiment 1.

When purifying the soluble organic substance with the catalytic converter 400, the exhaust gas from the diesel engine 46 is admitted into the exhaust oxidation catalytic layer 4 of the first purification unit 40 as FIG. 10 shows. The gas is subjected to oxidation to purify the soluble organic substance into $CO_2$ and $H_2O$. Heat generation is also accompanied with the reaction, which increases the exhaust gas temperature.

The heated gas is then admitted into the cooling core 2 for cooling, where the gas is deprived of its heat to be released to the housing 3. Fins 35 of the housing 3 efficiently helps to release heat to the outside of the catalytic converter 400. The exhaust gas after passing through the first unit 40 is mitigated to have the same temperature as the initial gas temperature before flowing into the first purification unit 40.

The mitigated exhaust gas from the first unit 40 is admitted into the exhaust oxidation catalytic layer 4 of the second unit 40, where the soluble organic substance is purified again. The heated gas due to exothermic heat of reaction is mitigated again in the succeeding cooling core 2 in the same manner as described above.

The exhaust gas is designed to flow through 5 stages of purification units to purify the soluble organic substance contained therein, while inhibiting excessive oxidation and keeping the exhaust gas at specific temperature for the peak conversion efficiency.

Since the exhaust gas temperature does not increased during the purification, the sulfur compound contained in the exhaust gas from the diesel engine is not oxidized due to high temperature, which produces no sulfate.

FIG. 11 shows relationships between the conversion efficiency of the soluble organic substance (SOF), or sulfate formation ratio of the sulfur compound in the exhaust gas (Sulfate), and the temperature of the exhaust gas.

The temperature of the exhaust gas refers to the one measured at the inlet to the exhaust oxidation catalytic layer or the one of the catalyst bed. The measurement shown in the graph used the conventional exhaust oxidation catalytic converter of monolith type without cooling core as different catalytic converter from that shown in FIG. 10.

Hydrocarbons contained in the soluble organic substance is composed of various kinds of components. As dotted lines in the graph of FIG. 11 show, the SOF conversion efficiency is variable within a particular temperature range. Increase in the temperature improves the conversion efficiency of the soluble organic substance.

The sulfur compound in the exhaust gas reacts with oxygen in the exhaust gas at a higher reaction temperature than that of the soluble organic substance. Increase in the temperature accelerates the sulfate formation ratio. For example, at the temperature "M" in FIG. 11, the soluble organic substance can be purified almost 100%. At that temperature, however, the sulfur compound is also oxidized to form sulfate. While at the lower temperature "L", the sulfur compound is not formed, but the soluble organic substance cannot be purified to a satisfactory level.

More specifically, as FIG. 12 shows, when the exhaust gas containing the soluble organic substance is admitted into the catalytic oxidation layer 45, heat generation is accompanied with the oxidation. The exothermic heat is accumulated within the layer 45 to increase the exhaust gas temperature as it flows to the downstream through the catalytic converter as the curve N shows. When the exhaust gas flowing from the inlet 451 passes the distance "X", sulfur compounds begins to be oxidized to form sulfate.

In the conventional oxidation catalytic layer, the gas flow passing the distance "X" will increase its temperature enough to form the sulfate. As far as it is in the range from the inlet 451 to the predetermined distance "X", substantially no or negligible amount of sulfate is formed.

The present invention intended to overcome the above problem allows to purify the soluble organic substance efficiently, while inhibiting oxidation of the sulfur compound, i.e., formation of sulfate. This embodiment uses a plurality of purification units as combination of the exhaust oxidation catalytic layer and the cooling core. The exothermic heat generated through the purification process of soluble organic substance is released outside the catalytic converter to keep the temperature in the converter from increasing.

The Embodiment 7, therefore, efficiently purifies the soluble organic substance without forming sulfate.

Embodiment 8

Figure 13:
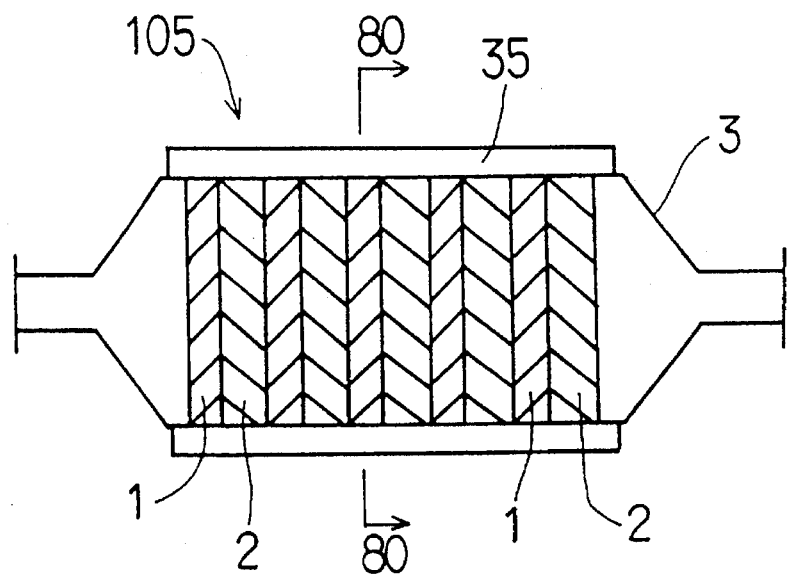
FIG. 13 is a plan view of the catalytic converter of Embodiment 8.
Figure 14:
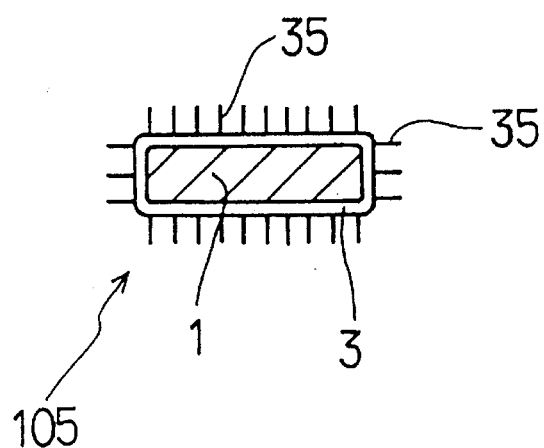
FIG. 14 is a sectional view of the catalytic converter of Embodiment 8, taken along the line 80—80 of FIG. 13.

The catalytic converter is formed into flat type as FIGS. 13 and 14 show. The catalytic converter 105 has a flat cross section as FIG. 14 shows. A number of fins 35 are provided with the outer periphery of the housing 3.

The flat shape of the housing 3 allows effective heat release in vertical direction so as to further facilitate the heat release from the cooling core 2. Other features are the same as in Embodiment 1. The catalytic converter of this type may be applied to Embodiment 1 relating to NOx purification, and Embodiment 7 relating to purification of exhaust gas from diesel engine, which provide the same effects as obtained in those embodiments.

Embodiment 9

Figure 15:
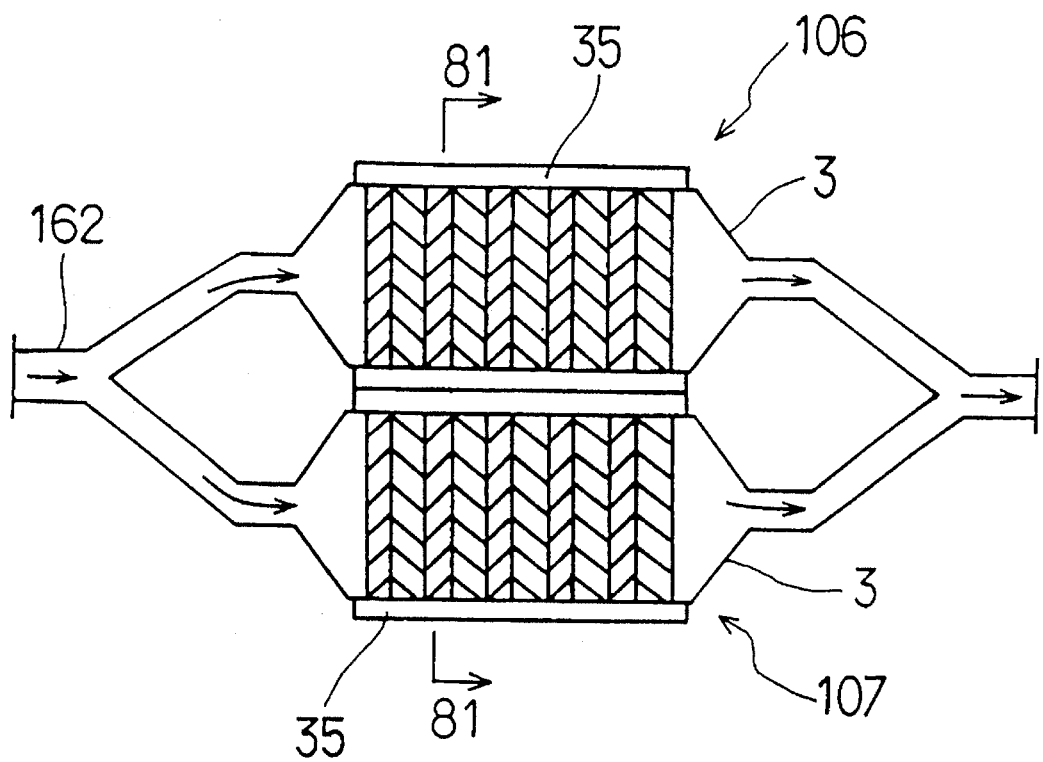
FIG. 15 is a plan view of the catalytic converter of Embodiment 9.
Figure 16:
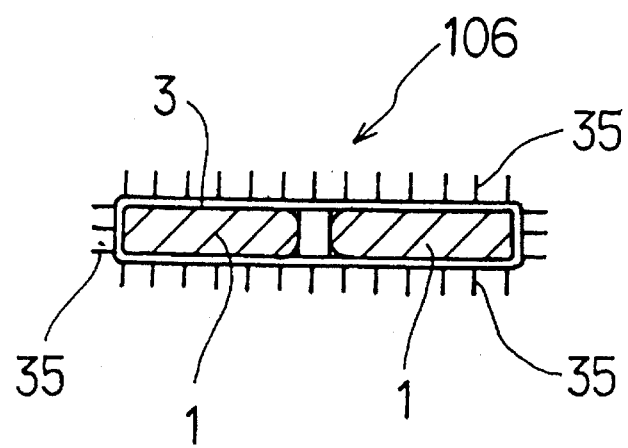
FIG. 16 is a sectional view of the catalytic converter of Embodiment 9, taken along the line 81—81 of FIG. 15.
Figure 17:
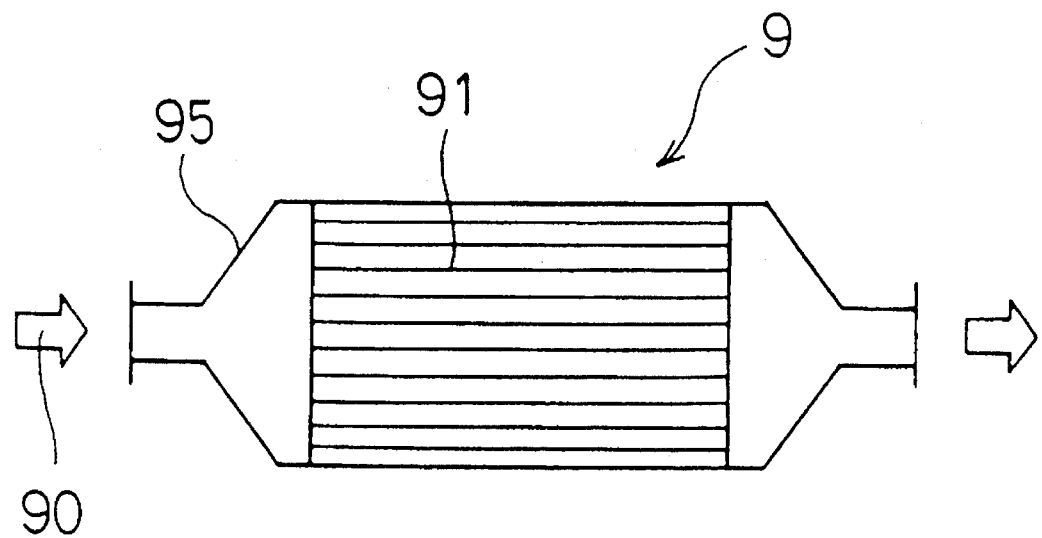
FIG. 17 is an explanatory view of the conventional catalytic converter as prior art.

As FIGS. 15 and 16 show, the catalytic converters of flat type the same as in Embodiment 8 are aligned in two lines. In this embodiment, two catalytic converters 106 and 107, placed in lateral direction and aligned in parallel, are connected through the exhaust pipe 162. A number of fins 35 are provided with the outer periphery of the housing 3.

The converter of this embodiment can be further downsized to improve heat release ability compared with larger converter. This embodiment provides the same effects as those obtained in Embodiment 8.

Embodiment 10

In this embodiment, two types of exhaust oxidation catalytic layers as below are applied to the converter for purifying exhaust gas from diesel engine described in Embodiment 7 to conduct various measurements.
Exhaust oxidation catalytic layer:
Type A:
Used metal honeycomb structure coated with silica gel to carry platinum as catalytic component. The amount of platinum to be carried on 1 liter of the honeycomb carrier was 2 g. The metal honeycomb structure had: the length of 100 mm, diameter of 70 mm, 360 cells/in$^2$, and thickness of 50 μm.

The amount of silica gel coated with the honeycomb carrier was 80 g/l.
Type B:
Used the same construction as type A except that mordenite(100 g/l) was coated with the honeycomb structure to carry palladium (4 g/l) as catalytic component.
(Test 1: Comparative example)
The converter provided with the above exhaust oxidation catalytic layers was connected to the exhaust pipe of the diesel engine of 1500 cc displacement. The soluble organic substance (SOF) and sulfur compound ($SO_2$) in the exhaust gas were measured at the inlet and outlet of the converter at variable loads to the engine and temperatures.

Figure 18:
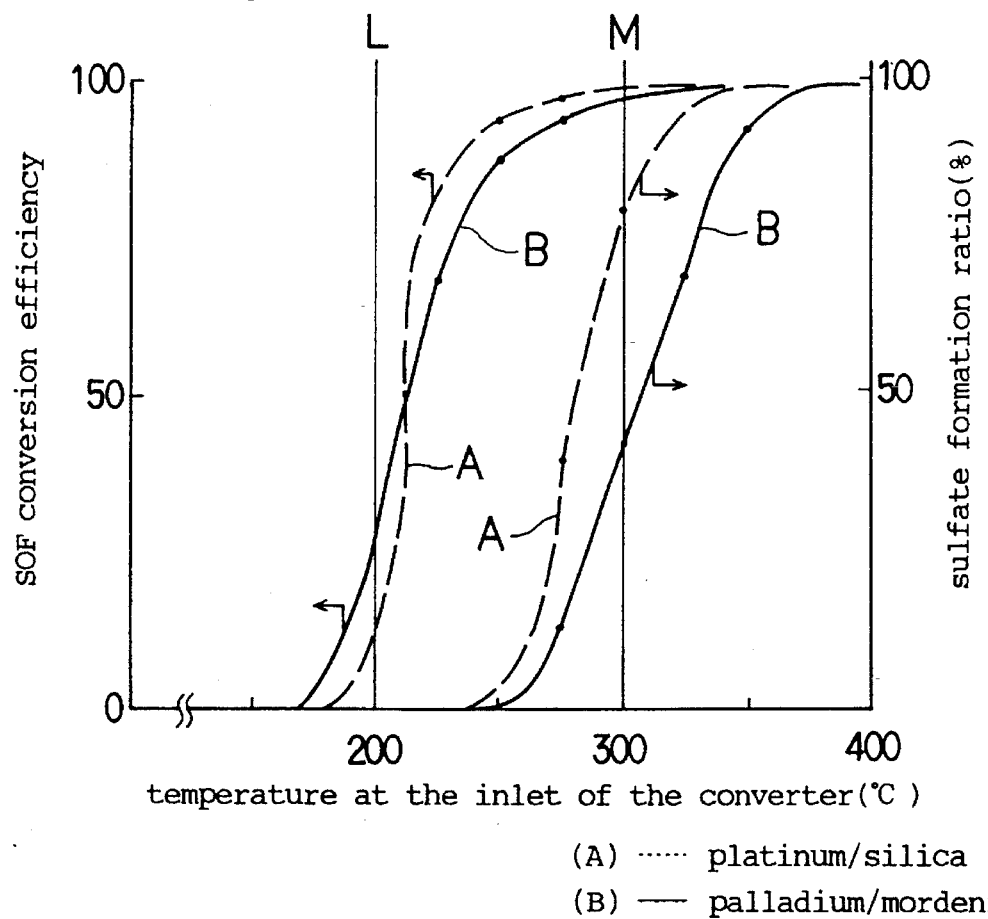
FIG. 18 is a graph showing the relationship between the temperature around the converter inlet, and the conversion efficiency of soluble organic substance or the sulfate formation ratio in Embodiment 10.

FIG. 18 shows the measurement results with axis of abscissa of the temperature at the inlet (° C), and with axis of ordinates of the conversion efficiency of the soluble organic substance (SOF), or sulfate formation ratio of the sulfur compound in the exhaust gas (Sulfate). This experiment used no cooling cores in the converter.

As the graph of FIG. 18 shows, most of the SOF was purified as well as forming substantial amount of sulfate at 300 ° C. ("M") in both exhaust oxidation catalytic layers A and B. While at the lower temperature of 200 ° C. ("L") , although sulfate was not formed, conversion efficiency of SOF resulted low value.
(Test 2: Comparative Example)

The converter was provided with 5 exhaust oxidation catalytic layers (Type A), each having a length of 20 mm, then total length was 100 mm. The gas composition was measured at the points every 20 mm from the inlet. The temperature of the exhaust gas at the converter inlet was 300° C.

Figure 19:
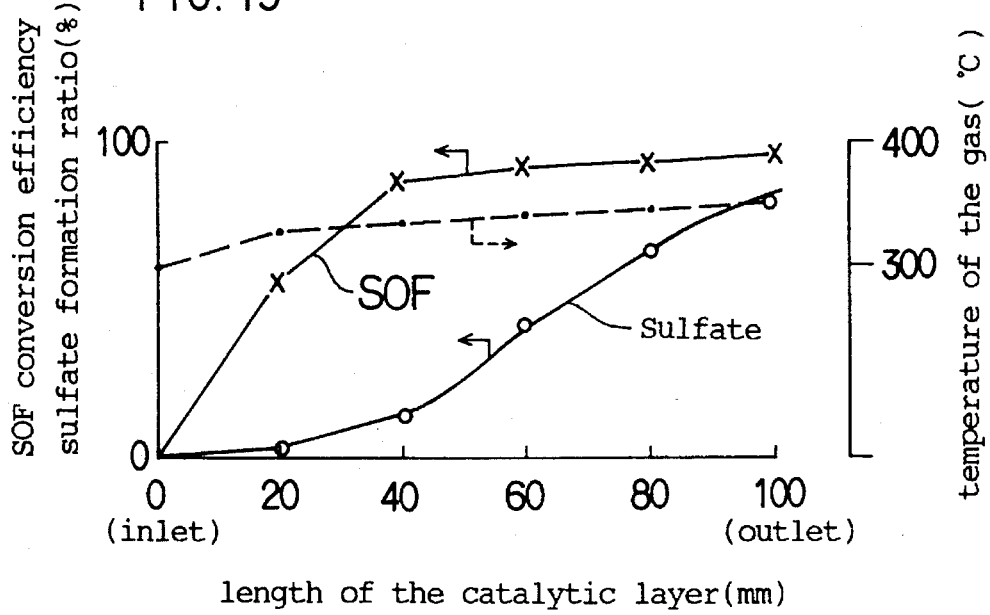
FIG. 19 is a graph showing the relationship between the length of the conventional catalytic layer in the comparative example, and the conversion efficiency of the soluble organic substance or the sulfate formation ratio in Embodiment 10.

FIG. 19 shows the measurement results. This example used no cooling cores in the converter.

As indicated by the graph, SOF conversion efficiency measured approximately 80% and sulfate formation ratio measured only 15% at the second exhaust oxidation catalytic layer at a distance of 40 mm from the inlet in downstream. At the outlet of the last layer, SOF conversion efficiency resulted 95% and sulfate formation ratio resulted 85%, respectively. As the exhaust gas flows to downstream, sulfate formation ratio increased. The temperature of the gas was incremented as it sequentially flows through those layers.
(Test 3: Present invention)

Figure 20:
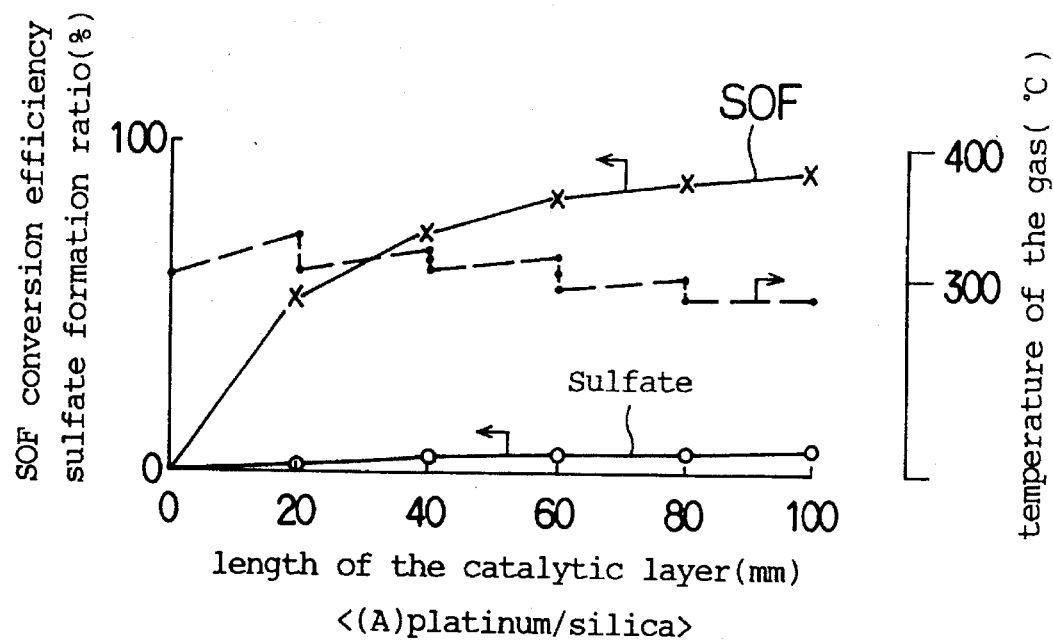
FIG. 20 is a graph showing the relationship between the length of the catalytic layer of the present invention, and the conversion efficiency of soluble organic substance or the sulfate formation ratio in Embodiment 10.

Cooling cores formed of metal honeycomb structure with thickness of 20 mm were interposed between the respective 5 exhaust oxidation catalytic layers (A) to conduct measurement in the same manner as Test 2. FIG. 20 shows the measurement results. This test used the same converter as in Embodiment 7.

The SOF conversion efficiency measured high value of 95%, while no sulfate was formed. Each temperature measured at the outlet of the 5 respective exhaust oxidation catalytic layers was kept around 300° C. This converter obviously achieved the high SOF conversion efficiency.
(Test 4: Present invention)

Figure 21:
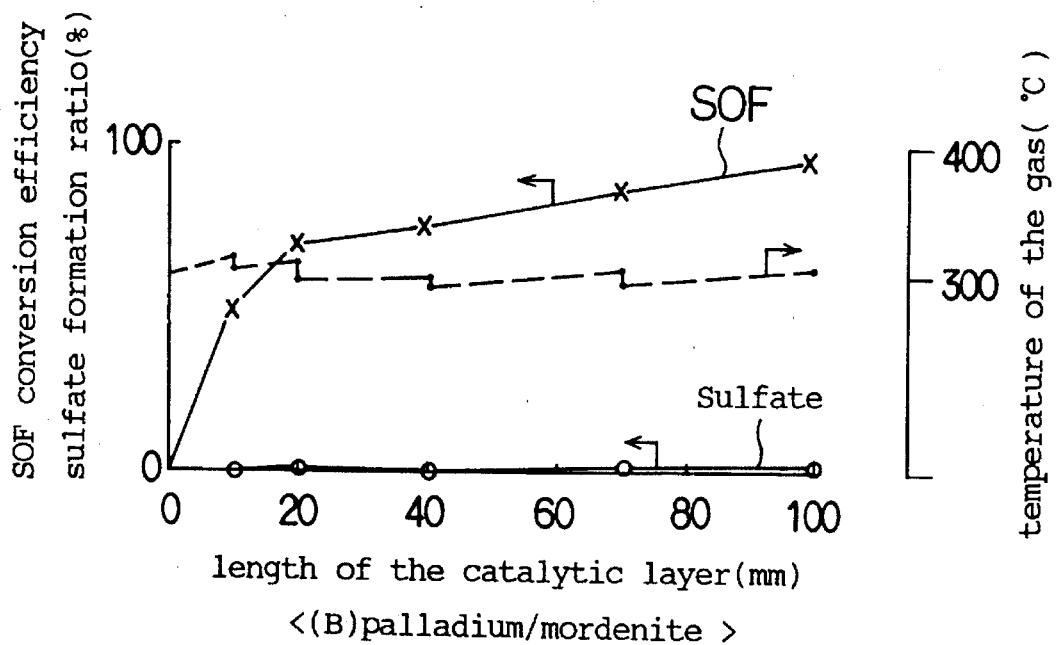
FIG. 21 is a graph showing the relationship between the length of the catalytic layer of the present invention, and the conversion efficiency of soluble organic substance or the sulfate formation ratio in Embodiment 10.

The exhaust oxidation catalytic layer (B) was divided into 5 parts having the respective lengths of 10 mm, 10 mm, 20 mm, 30 mm and 30 mm to be arranged in this order within the converter. The cooling cores were interposed between the respective exhaust oxidation catalytic layers. Other features were the same as those of Test 3. FIG. 21 shows the measurement results.

The graph in FIG. 21 shows that this converter measured higher conversion efficiency of SOF and substantially low sulfate formation ratio. The temperature of the gas flowing through the respective 5 exhaust oxidation catalytic layers were kept around 300 ° C. This test shows that the converter provides the excellent SOF purification capability.

What is claimed is:

1. A catalytic converter for exhaust gas NOx purification comprising a plurality of purification units serially arranged in a housing, each of which comprises a catalytic layer for reducing NOx and a separate cooling core without catalyst for cooling exhaust gas admitted through said catalytic layer, through which said exhaust gas flows sequentially, wherein said cooling core transfers heat from said exhaust gas to outside said converter.

2. The catalytic converter for NOx purification as in claim 1 wherein an oxidation catalytic layer for oxidizing hydrocarbons in exhaust gas is provided on the downstream side of said plurality of purification units.

3. The catalytic converter for NOx purification as in claim 2, wherein said catalytic component of said oxidation catalytic layer is one or more materials selected from the group consisting of platinum, palladium and rhodium.

4. The catalytic converter for NOx purification as in claim 1 wherein said catalytic layer is composed of catalytic component and a porous carrier which carries said catalytic component.

5. The catalytic converter for NOx purification as in claim 4, wherein said catalytic component is one or more kinds of materials selected from the group consisting of platinum, palladium, rhodium, copper, and nickel.

6. The catalytic converter for NOx purification as in claim 4, wherein said porous carrier is one or more structures selected from the group consisting of ceramic or metal honeycomb, metal wire netting, and perforated metal with air slits.

7. The catalytic converter for NOx purification as in claim 1, wherein said catalytic layer has a thickness ranging from 1 to 20 mm.

8. The catalytic converter for NOx purification as in claim 1, wherein said cooling core comprises one or more structures selected from the group consisting of metal honeycomb, metal wire netting, and perforated metal with air slits.

9. The catalytic converter for NOx purification as in claim 1, wherein said cooling core is one or more materials selected from the group consisting of stainless steel, heat-resistance steel, copper, and aluminum.

10. The catalytic converter for NOx purification as in claim 1, wherein said housing is provided with a plurality of fins on its outer periphery.

11. The catalytic converter for NOx purification as in claim 1, wherein the amount of said catalytic component carried on each of said catalytic layer is incremented from upstream to downstream along the flow of said exhaust gas.

12. The catalytic converter for NOx purification as in claim 1, wherein a space is provided between said catalytic layers and said cooling cores which ranges from 4 mm to 20 mm.

13. The catalytic converter for $NO_x$ purification as in claim 1, further comprising means for introducing a reducing agent.

14. A catalytic converter for purifying exhaust gas, comprising a plurality of purification units serially arranged in a housing, each of which comprises an exhaust oxidation catalytic layer for oxidizing a soluble organic substance in exhaust gas from a diesel engine, and a separate cooling core without catalyst for cooling said exhaust gas admitted through said exhaust oxidation catalytic layer, through which said exhaust gas flows sequentially, wherein said cooling core transfers heat from said exhaust gas to outside said converter.

15. The catalytic converter for purifying exhaust gas as in claim 14, wherein said exhaust oxidation catalytic layer comprises a catalytic component and a porous carrier which carries said catalytic component.

16. The catalytic converter for purifying exhaust gas as in claim 14, wherein said catalytic component comprises one or more materials selected from the group consisting of platinum, palladium, rhodium, and transition metals combined therewith.

17. The catalytic converter for purifying exhaust gas as in claim 14, wherein said catalytic layer has a thickness ranging from 1 mm to 20 mm.

18. The catalytic converter for purifying exhaust gas as in claim 14, wherein said cooling core comprises one or more structures selected from the group consisting of metal honeycomb, metal wire netting, and perforated metal with air slits, wherein the temperature of exhaust gas within the converter remains below a temperature at which sulfur is converted to sulfate during purification of said exhaust gas.

19. The catalytic converter for purifying exhaust gas as in claim 14, wherein said cooling core is formed of one or more materials selected from the group consisting of stainless steel, heat resistance steel, copper, and aluminum, wherein the temperature of exhaust gas within the converter remains below a temperature at which sulfur is converted to sulfate during purification of said exhaust gas.

20. The catalytic converter for purifying exhaust gas as in claim 14, wherein said housing is provided with a plurality of fins on its outer periphery.

21. The catalytic converter for purifying exhaust gas as in claim 14, wherein the amount of catalytic component carried on each of said catalytic layers is incremented from upstream to downstream along the flow of said exhaust gas.

22. The catalytic converter for purifying exhaust gas as in claim 14 wherein a space is provided between each of said exhaust oxidation catalytic layers and said cooling cores which ranges from 4 mm to 20 mm.

\* \* \* \* \*